(12) United States Patent
Straker et al.

(10) Patent No.: US 12,448,217 B2
(45) Date of Patent: Oct. 21, 2025

(54) CONVEYING SYSTEM

(71) Applicant: Ambaflex International B.V., Zwaag (NL)

(72) Inventors: Quincy Straker, Hoorn (NL); Dick Kuin, Wervershoof (NL); Wouter Balk, Baambrugge (NL)

(73) Assignee: Ambaflex International B.V., Zwaag (NL)

( * ) Notice: Subject to any disclaimer, the term of this patent is extended or adjusted under 35 U.S.C. 154(b) by 261 days.

(21) Appl. No.: 18/449,441

(22) Filed: Aug. 14, 2023

(65) Prior Publication Data
US 2024/0083685 A1 Mar. 14, 2024

(30) Foreign Application Priority Data
Aug. 16, 2022 (EP) .................... 22190627

(51) Int. Cl.
*B65G 21/18* (2006.01)
*B65G 37/00* (2006.01)

(52) U.S. Cl.
CPC ............. *B65G 21/18* (2013.01); *B65G 37/00* (2013.01); *B65G 2207/24* (2013.01)

(58) Field of Classification Search
CPC ..... B65G 21/18; B65G 37/00; B65G 2207/24
USPC ..................................................... 198/347.1
See application file for complete search history.

(56) References Cited

U.S. PATENT DOCUMENTS 10,259,654 B2    4/2019   Balk et al.
11,026,447 B2 *  6/2021   Calzolari ........... B65G 47/5131
2017/0291770 A1 10/2017  Balk et al.

FOREIGN PATENT DOCUMENTS

EP        3228564 A1   10/2017

* cited by examiner

*Primary Examiner* — Gene O Crawford
*Assistant Examiner* — Lester Iii Rushin
(74) *Attorney, Agent, or Firm* — Steven M. Koehler; Westman, Champlin & Kochler, P.A.

(57) ABSTRACT

A conveying system has a lower end of a helical path of a conveying section of a first conveyor located at a lower level than a lower end of a helical path of a conveying section of a second conveyor. An upper end of the helical path of the conveying section of the second conveyor is located at a higher level than an upper end of the helical path of the conveying section of the first conveyor. The upper end of the helical path of the conveying section of the first conveyor is located between the lower end and the upper end of the helical path of the conveying section of the second conveyor. A transfer region is between the helical path lower end of the conveying section of the second conveyor and the helical path upper end of the conveying section of the first conveyor.

21 Claims, 9 Drawing Sheets

CONVEYING SYSTEM

BACKGROUND

The discussion below is merely provided for general background information and is not intended to be used as an aid in determining the scope of the claimed subject matter.

The present invention relates to a conveying system for transporting a product in vertical direction, comprising a drivable endless first conveyor belt and a drivable endless second conveyor belt, each having a conveying section for supporting and transporting a product and a return section, which conveying section extends along at least a helical path including a plurality of windings about a centerline between a lower end and an upper end of the helical path, wherein the lower end of the helical path of the conveying section of the first conveyor belt is located at a lower level than the lower end of the helical path of the conveying section of the second conveyor belt, wherein the upper end of the helical path of the conveying section of the second conveyor belt is located at a higher level than the upper end of the helical path of the conveying section of the first conveyor belt.

Such a conveying system is known from EP 3 228 564. The known conveying system is suitable for conveying products in vertical direction through two or more endless conveyor belts which are stacked onto each other. This provides a tall helical conveying system which has a long total helical transport path, but wherein a single extremely long conveyor belt is avoided.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A conveying system herein disclosed has an upper end of the helical path of the conveying section of the first conveyor belt located between the lower end and the upper end of the helical path of the conveying section of the second conveyor belt. The conveying system is provided with a transfer region between the lower end of the helical path of the conveying section of the second conveyor belt and the upper end of the helical path of the conveying section of the first conveyor belt where the first and second conveyor belts extend parallel and next to each other and move in the same direction of movement under operating conditions and with a transfer member for displacing a product between the first and second conveyor belts at the transfer region.

The conveying system provides the opportunity to transport a product successively by the first conveyor belt and the second conveyor belt between the lower end of the helical path of the conveying section of the first conveyor belt and the upper end of the helical path of the conveying section of the second conveyor belt or vice versa. For example, a product can be placed on the conveyor belt at the lower end of the helical path of the first conveyor belt and transported upwardly along the helical path of the conveying section of the first conveyor belt. At a certain moment the product arrives at the transfer region where it can be transferred from the first conveyor belt to the second conveyor belt in transverse direction of the first and second conveyor belts. Then, the product can be transported further upwardly along the helical path of the conveying section of the second conveyor belt in a direction towards the upper end of the helical path of the second conveyor belt. Since the first and second conveyor belts are parallel and next to each other at the transfer region the displacement between the first and second conveyor belts can be performed smoothly.

A further advantage of the conveying system is that the arrangement of the two conveyor belts create a tall helical conveying system having separate endless conveyor belts which have relatively limited lengths.

The conveying section of each of the first and second conveyor belts is suitable for transporting a product in a horizontal direction or inclined direction. The return section may be unsuitable for transporting a product because of the orientation of the conveyor belt; for example, a product supporting side or upper side of the conveyor belt may face horizontally or downwardly at the return section.

The first and second conveyor belts may be slat belts having slats which are movable with respect to each other and often mounted on top of an endless driving element such as a chain. The slats may be elongate in transverse direction of the direction of movement of the slat belt under operating conditions.

The helical paths of the conveying sections of the first and second conveyor belts may have respective coinciding central axes.

The return section of at least one of the first and second conveyor belts may extend below the conveying section, following the helical path of the conveying section upside down with respect to the conveying section. In this case there may be reversing elements at the upper and lower ends of the helical path of the conveying section of the at least one of the first and second conveyor belts in order to turn the conveyor belt upside down.

The return section of at least one of the first and second conveyor belts may extend along a non-helical path. This provides the opportunity to guide the at least one of the first and second conveyor belts along a relatively short path which is shorter than a helical path.

In an embodiment the at least one of the first and second conveyor belts has a downward bend which is located such that the conveyor belt follows a horizontally oriented upper path between the upper end of the helical path of its conveying section and the downward bend and a vertically oriented path below the downward bend, which vertically oriented path is located at an outer side of the windings of the helical path of its conveying section. This means that under operating conditions the at least one of the first and second conveyor belts successively follows the horizontally oriented upper path, the downward bend and the vertically oriented path or vice versa.

In a particular embodiment the at least one of the first and second conveyor belts has a reverse bend at the lower end of the helical path of its conveying section for turning the conveyor belt upside down, wherein the at least one of the first and second conveyor belts follows a horizontally oriented lower path between the reverse bend and an upward bend, wherein the at least one of the first and second conveyor belts follows the vertically oriented path between the downward bend and the upward bend. This means that under operating conditions the at least one of the first and second conveyor belts successively follows the horizontally oriented upper path, the downward bend, the vertically oriented path, the upward bend, the horizontally oriented lower path and the reverse bend, or vice versa. It is noted that the horizontally oriented upper path may be considered as being a non-helical path of the conveying section of the at least one of the first and second conveyor belts, such that the conveying section follows a helical path as well as a non-helical path.

In a preferred embodiment, the downward bend is an upper downward bend and the at least one of the first and second conveyor belts has a lower downward bend which is located between the vertically oriented path and a horizontally oriented lower path, wherein the vertically oriented path between the upper downward bend and the lower downward bend has a J-shape and the horizontally oriented lower path extends between the lower downward bend and the lower end of the helical path of its conveying section. In this case, under operating conditions the at least one of the first and second conveyor belts successively follows the horizontally oriented upper path, the downward bend, the J-shaped vertically oriented path, the lower downward bend, the horizontally oriented lower path, or vice versa. An advantage of this configuration is that the at least one of the first and second conveyor belts can have only positive bends, i.e. at the upper and lower downward bends the at least one of the first and second conveyor belts bends about an axis extending perpendicularly to the direction of movement under operating conditions and below a product supporting side or an upper side thereof. Within the J-shape the at least one of the first and second conveyor belts bends about an axis which extends perpendicularly to the product supporting side or the upper side thereof. A bottom of the J-shape will be located below the height level of a lower winding of the helical path of the conveying section of the at least one of the first and second conveyor belts.

The J-shaped vertically oriented path may extend within a vertical plane. This means that the at least one of the first and second conveyor belts bends within a plane in which its product supporting side or its upper side lies.

In a practical embodiment the first conveyor belt has the reverse bend at the lower end of the helical path of its conveying section and follows the horizontally oriented lower path between the reverse bend and the upward bend and the vertically oriented path between the downward bend and the upward bend of the first conveyor belt, and wherein the second conveyor belt has the upper downward bend and the lower downward bend, which lower downward bend is located between the vertically oriented path and the horizontally oriented lower path of the second conveyor belt, wherein the vertically oriented path between the upper downward bend and the lower downward bend of the second conveyor belt has a J-shape and its horizontally oriented lower path extends between the lower downward bend and the lower end of the helical path of its conveying section. This means that only the second conveyor belt has the J-shape. Since the bottom of the J-shape is located below the height level of a lower winding of the helical path of the conveying section of the second conveyor belt, a lower part of the J-shape may be located next to the windings or a part of the windings of the helical path of the conveying section of the first conveyor belt. If the first conveyor belt would also have the J-shape there must be sufficient space below the lower winding of the conveying section of the first conveyor belt to accommodate it. If the first conveyor belt is located at a position just above the floor the J-shape may be undesired.

The transfer region along the first and second conveyor belts may be shorter than one winding, preferably smaller than a half winding.

The transfer member may be adapted such that it pushes a passing product from one of the first conveyor belt and the second conveyor belt to the other one of the first conveyor belt and the second conveyor belt.

The transfer member may comprise a guide which extends along the transfer region and which is located such that under operating conditions a passing product is forced from the one of the first conveyor belt and the second conveyor belt to the other one of the first conveyor belt and the second conveyor belt.

The transfer member may be controllable between a transfer mode in which the transfer member is adapted such that it displaces a passing product from one of the first conveyor belt and the second conveyor belt to the other one of the first conveyor belt and the second conveyor belt and a non-transfer mode in which the transfer member does not displace a passing product from one of the first conveyor belt and the second conveyor belt to the other one of the first conveyor belt and the second conveyor belt. This means that at the transfer region a product can remain on the first conveyor belt when the product is transported upwardly on the first conveyor belt or on the second conveyor belt when the product is transported downwardly on the second conveyor belt. This provides the opportunity to allow a product to leave the helical path of the conveying section of the first conveyor belt without being transferred to the second conveyor belt or leave the helical path of the conveying section of the second conveyor belt without being transferred to the first conveyor belt, respectively.

At the transfer region upper sides of the conveying sections of the first and second conveyor belts may be flush with each other, which is advantageous in case of transporting mass flow products like bottles, cans and the like, since the risk of tipping over of such products can be minimized.

In an alternative embodiment, at least an edge portion of an upper side of the conveying section of the one of the first conveyor belt and the second conveyor belt lies at a higher level than at least an edge portion of an upper side of the conveying section of the other one of the first conveyor belt and the second conveyor belt, which edge portions are adjacent to each other and extend along to transfer region. When a passing product at the transfer region is pushed in a direction from the one of the first conveyor belt and the second conveyor belt to the other one of the first conveyor belt and the second conveyor belt the product will not immediately contact the other one of the first conveyor belt and the second conveyor belt. As soon as the center of gravity of the product passes an edge of the one of the first conveyor belt and the second conveyor belt the product may tilt over the edge, hence loosing contact with the one of the first conveyor belt and the second conveyor belt and contacting the other one of the first conveyor belt and the second conveyor belt. This minimizes the time period in which a product contacts both the first conveyor belt and the second conveyor belt. Particularly, in the event that the angular speeds of the first conveyor belt and the second conveyor belt are different this may minimize the risk of wear of a product supporting side of the first and second conveyor belts. In practice, the product supporting side may be provided with an anti-slip coating, which should preferably be maintained.

In another alternative embodiment the upper sides of the first and second conveyor belts are angled with respect to each other such that their common upper side forms an angle larger than 180° as seen in cross-section.

In still another alternative embodiment, a lifting element is provided between the conveying sections of the first and second conveyor belts at the transfer region, which lifting element is adapted such that an upper side thereof gradually rises above the first and second conveyor belts in the direction of movement of the first and second conveyor belts in order to lift a product that is moving from the one of the first conveyor belt and the second conveyor belt to the other one of the first conveyor belt and the second conveyor belt before it arrives at the other one of the first conveyor belt and the second conveyor belt. This has a comparable effect as the latter embodiment. When a passing product at the transfer region is pushed in a direction from the one of the first conveyor belt and the second conveyor belt to the other one of the first conveyor belt and the second conveyor belt the product will first be moved above the lifting element without be being hindered by the lifting element and then further move while the upper side of the lifting element is rising. At a certain moment the product will tip over the lifting element, hence loosing contact with the one of the first conveyor belt and the second conveyor belt and contacting the other one of the first conveyor belt and the second conveyor belt.

It is noted that the way of transferring a product between parallel conveyor belts as described above is not limited to the stack of the first and second conveyor belts or to helical conveyor belts, but may also be applicable in general to conveyor belts which are parallel and next to each other and driven in the same direction.

Preferably, under operating conditions the speeds of the first conveyor belt and the second conveyor belt are controlled such that their angular speeds are substantially the same at the transfer region. This minimizes friction and therefore wear when a product contacts the first and second conveyor belts at the same time during transferring the product between the first and second conveyor belts.

The helical paths of the conveying sections of the first and second conveyor belts may have such radii that imaginary projections thereof on a plane perpendicular to their centerlines fit into each other. This means that the helical paths of the conveying sections of the first and second conveyor belts are different such that they fit within each other to form a nested structure. For example, when the radius of the helical path of the conveying section of the second conveyor belt is larger than the radius of the helical path of the conveying section of the first conveyor belt and an upper winding of the first conveyor belt or a part thereof extends parallel and next to a lower winding of the second conveyor belt or a part thereof, hence forming the transfer region, the second conveyor belt forms an outer track and the first conveyor belt forms an inner track at the transfer region.

The centerlines of the helical paths of the conveying sections of the first and second conveyor belts may coincide.

In a particular embodiment the conveying system comprises at least a drivable endless third conveyor belt having a conveying section for supporting and transporting a product and a return section, which conveying section of the third conveyor belt extends along at least a helical path including a plurality of windings about a centerline between a lower end and an upper end of the helical path of the conveying section of the third conveyor belt, wherein the upper end of the helical path of the conveying section of the third conveyor belt is located at a higher level than the upper end of the helical path of the conveying section of the second conveyor belt and wherein the upper end of the helical path of the conveying section of the second conveyor belt is located between the lower end and the upper end of the helical path of the conveying section of the third conveyor belt, wherein the transfer region is a first transfer region and the conveying system is provided with a second transfer region between the lower end of the helical path of the conveying section of the third conveyor belt and the upper end of the helical path of the conveying section of the second conveyor belt where the conveying sections of the second and third conveyor belts extend parallel and next to each other, wherein the transfer member is a first transfer member and the conveying system is provided with a second transfer member for displacing a product between the second and third conveyor belts at the second transfer region. This embodiment forms a stack of the first, second and third conveyor belts.

Preferably, at the first transfer region the first conveyor belt forms an outer track and the second conveyor belt forms an inner track, whereas at the second transfer region the second conveyor belt forms an inner track and the third conveyor belt forms an outer track, or wherein at the first transfer region the first conveyor belt forms an inner track and the second conveyor belt forms an outer track, whereas at the second transfer region the second conveyor belt forms an outer track and the third conveyor belt forms an inner track. In these conditions the first and third conveyor belts can be driven at the same speed which is different from the speed at which the second conveyor belt is driven such that the angular speeds of the first and second conveyor belts at the first transfer region as well as the angular speeds of the second and third conveyor belts at the second transfer regions are the same.

BRIEF DESCRIPTION OF THE DRAWINGS

Aspects of the invention will hereafter be elucidated with reference to very schematic drawings showing embodiments of the invention by way of example.

DETAILED DESCRIPTION

Figure 1:
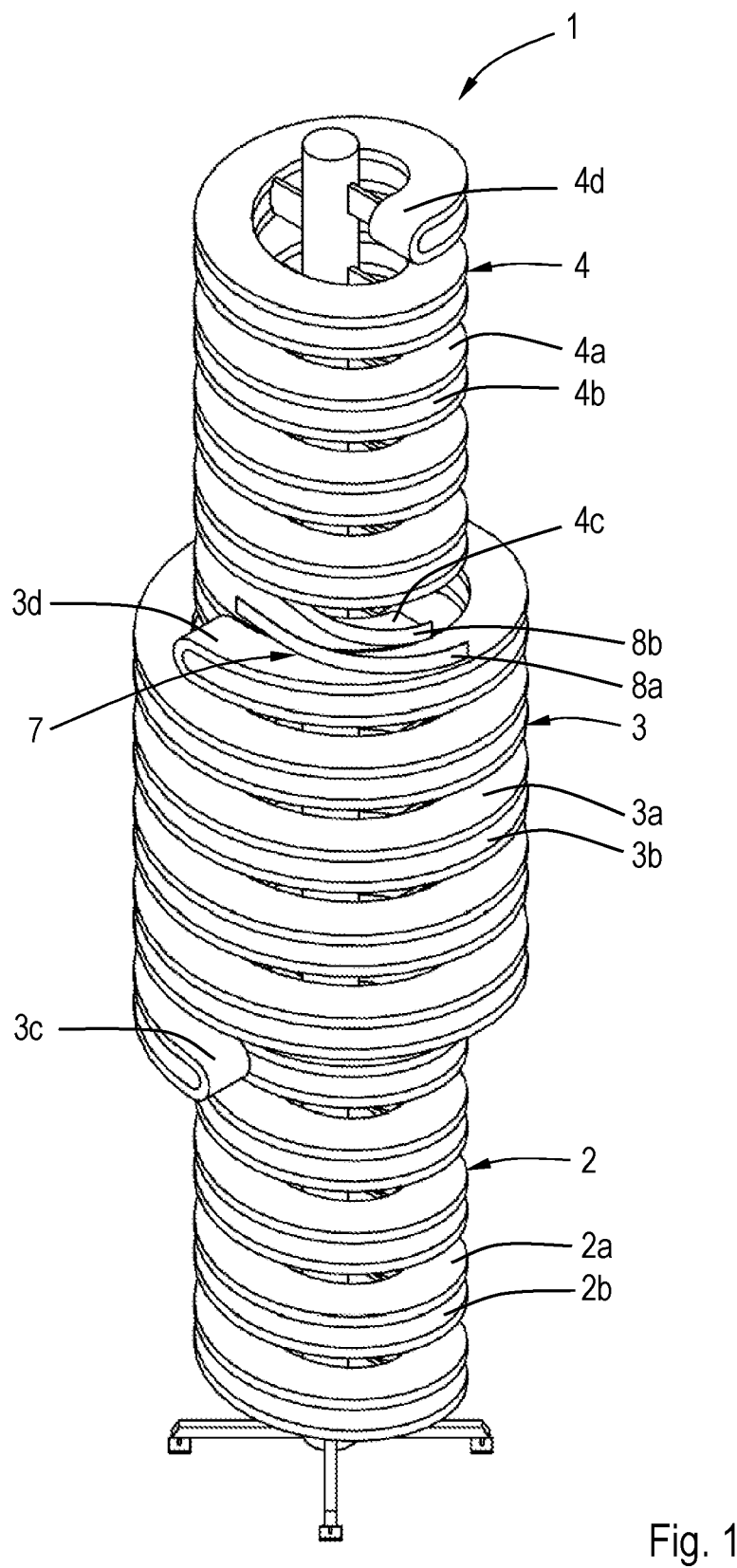
FIG. 1 is a perspective view of an embodiment of a conveying system.
Figure 2:
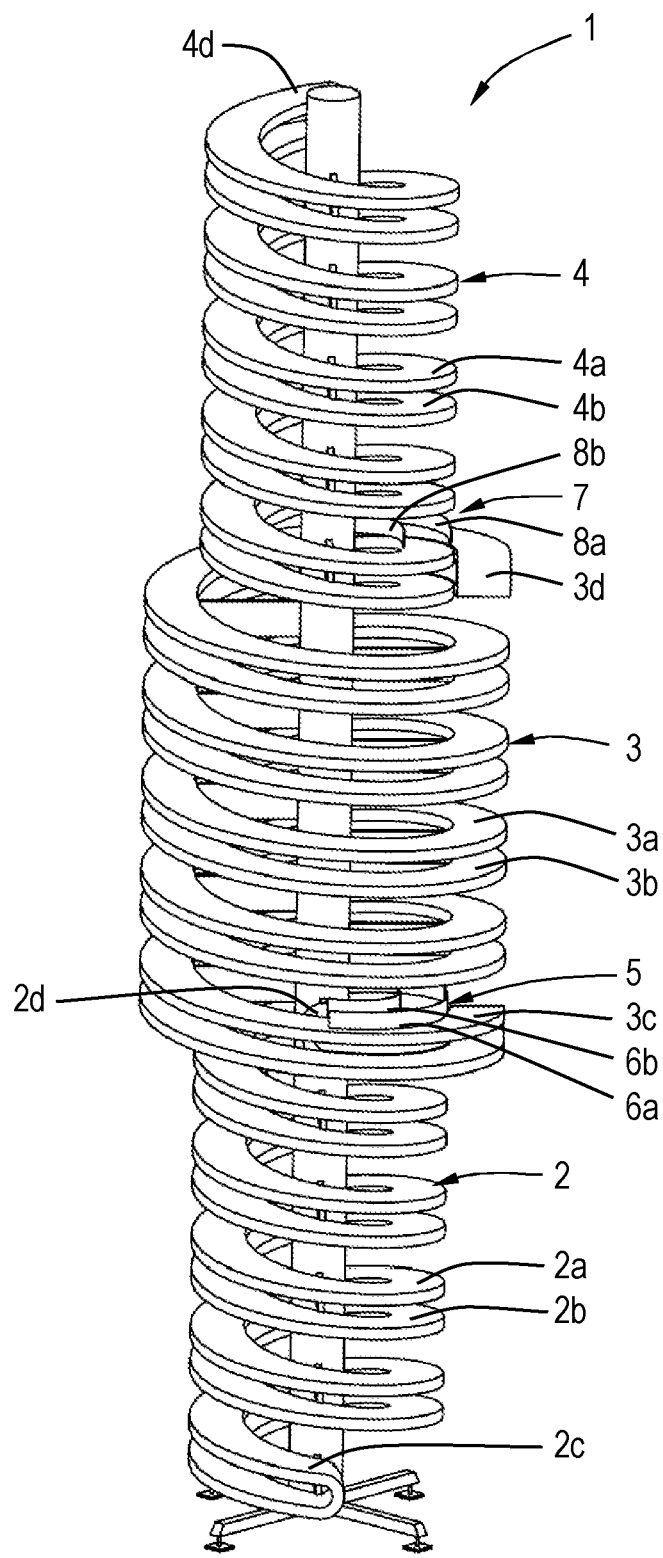
FIG. 2 is a similar view as FIG. 1, showing the conveying system from a different side.

FIGS. 1 and 2 show an embodiment of a conveying system 1. The conveying system 1 is suitable for transporting a product upwardly or downwardly, i.e. in vertical direction. The conveying system 1 comprises a drivable endless first conveyor belt 2, a drivable endless second conveyor belt 3 and a drivable endless third conveyor belt 4. The first to third conveyor belts 2-4 may be well-known slat belts having slats which are movable with respect to each other and often mounted on top of an endless driving element such as a chain. In the latter case, preferably, the slat belt follows bends about an axis extending perpendicularly to its direction of movement and below a product supporting side thereof, i.e. a positive bend, than bends about an axis extending perpendicularly to the direction of movement and above the product supporting side thereof, i.e. a negative bend, since the minimum radius of the positive bend can be smaller than the minimum radius of the negative bend.

Each of the first to third conveyor belts 2-4 has a conveying section 2a-4a for supporting and transporting a product and a return section 2b-4b. Each of the conveying sections 2a-4a extends along a helical path including a plurality of windings between a lower end 2c-4c and an upper end 2d-4d of the helical path. The helical paths have centerlines which coincide. In this embodiment the return sections 2b-4b also extend along respective helical paths below the respective conveying sections 2a-4a. The first to third conveyor belts 2-4 are reverted at the respective upper ends 2d-4d and lower ends 2c-4c of the helical paths of the corresponding conveying sections 2a-4a, i.e. positive bends, for example by means of reversing rollers, such that the respective return sections 2b-4b follow helical paths below the conveying sections 2a-4a.

The lower end 2c of the helical path of the conveying section 2a of the first conveyor belt 2 is located at a lower height level than the lower end 3c of the helical path of the conveying section 3a of the second conveyor belt 3 and the lower end 3c of the helical path of the conveying section 3a of the second conveyor belt 3 is located at a lower height level than the lower end 4c of the helical path of the conveying section 4a of the third conveyor belt 4. The upper end 3d of the conveying section 3a of the second conveyor belt 3 is located at a higher height level than the upper end 2d of the conveying section 2a of the first conveyor belt 2 and the upper end 4d of the helical path of the conveying section 4a of the third conveyor belt 4 is located at a higher height level than the upper end 3d of the helical path of the conveying section 3a of the second conveyor belt 3. The upper end 2d of the helical path of the conveying section 2a of the first conveyor belt 2 is located between the lower end 3c and the upper end 3d of the helical path of the conveying section 3a of the second conveyor belt 3 and the upper end 3d of the helical path of the conveying section 3a of the second conveyor belt 3 is located between the lower end 4c and the upper end 4d of the helical path of the conveying section 4a of the third conveyor belt 4.

The conveying system 1 is provided with a first transfer region 5 between the lower end 3c of the helical path of the conveying section 3a of the second conveyor belt 3 and the upper end 2d of the helical path of the conveying section 2a of the first conveyor belt 2. At the first transfer region 5 the conveying sections 2a, 3a of the first and second conveyor belts 2, 3 are parallel to each other. The first conveyor belt 2 forms an inner track and the second conveyor belt 3 forms an outer track at the first transfer region 5. The conveying system 1 is also provided with a first transfer member in the form of first guides 6a, 6b for displacing a product between the conveying sections 2a, 3a of the first and second conveyor belts 2, 3 at the first transfer region 5 so as to enable a product to be transported successively by the first conveyor belt 2 and the second conveyor belt 3 or in opposite direction. The first guides 6a, 6b may be parallel upright walls, of which an outer one 6a extends along outer bends of the conveying sections 2a, 3a of the first and second conveyor belts 2, 3 and crosses the conveying section 3a of the second conveyor belt 3 and of which an inner one 6b extends along inner bends of the conveying sections 2a, 3a of the first and second conveyor belts 2, 3 and crosses the conveying section 2a of the first conveyor belt 2. Since the conveying sections 2a, 3a of the first and second conveyor belts 2, 3 at the first transfer region 5 are parallel to each other products can be transferred smoothly between them.

It is noted that under operating conditions a portion of the conveying section 2a of the first conveyor belt 2 between the upper end 2d of its helical path and the inner one 6b of the first guides 6a, 6b is not used for transporting a product. Similarly, under operating conditions a portion of the conveying section 3a of the second conveyor belt 3 between the lower end 3c of its helical path and the outer one 6a of the first guides 6a, 6b is not used for transporting a product.

Similarly, the conveying system 1 is provided with a second transfer region 7 between the lower end 4c of the helical path of the conveying section 4a of the third conveyor belt 4 and the upper end 3d of the helical path of the conveying section 3a of the second conveyor belt 3. At the second transfer region 7 the conveying sections 3a, 4a of the second and third conveyor belts 3, 4 are parallel to each other. The second conveyor belt 3 forms an outer track and the third conveyor belt 4 forms an inner track at the second transfer region 7. The conveying system 1 is also provided with a second transfer member in the form of second guides 8a, 8b for displacing a product between the conveying sections 3a, 4a of the second and third conveyor belts 3, 4 at the second transfer region 7 so as to enable a product to be transported successively by the second conveyor belt 3 and the third conveyor belt 4 or in opposite direction. The second guides 8a, 8b may be parallel upright walls, of which an outer one 8a extends along outer bends of the conveying sections 3a, 4a of the second and third conveyor belts 3, 4 and crosses the conveying section 3a of the second conveyor belt 3 and of which an inner one 8b extends along inner bends of the conveying sections 3a, 4a of the second and third conveyor belts 3, 4 and crosses the conveying section 4a of the third conveyor belt 4. Since the conveying sections 2a, 3a of the second and third conveyor belts 2, 3 at the second transfer region 7 are parallel to each other products can be transferred smoothly between them.

It is noted that under operating conditions a portion of the conveying section 3a of the second conveyor belt 3 between the upper end 3d of its helical path and the outer one 8a of the second guides 8a, 8b is not used for transporting a product. Similarly, under operating conditions a portion of the conveying section 4a of the third conveyor belt 4 between the lower end 4c of its helical path and the inner one 8b of the second guides 8a, 8b is not used for transporting a product.

The first and second transfer regions 5, 7 have a length of about a quarter of a winding of the corresponding helical paths, but this may be different in an alternative embodiment.

In the embodiment as shown in FIGS. 1 and 2 the first to third conveyor belts 2-4 may be driven such that the respective conveying sections 2a-4a thereof turn clockwise as seen from above. A product that is placed on the first conveyor belt 2 at the lower end 2c of the helical path of its conveying section 2a will be transported upwardly and displaced outwardly by the inner one 6b of the first guides 6a, 6b at the first transfer region 5 from the first conveyor belt 2 to the second conveyor belt 3. Subsequently, the product will be transported further upwardly by the second conveyor belt 3. Upon passing the second transfer region 7 the product will be displaced inwardly from the second conveyor belt 3 to the third conveyor belt 4 by the outer one 8a of the second guides 8a, 8b. Then, the product will be transported further upwardly by the third conveyor belt 4. Similarly, the first to third conveyor belts 2-4 can be driven such that the respective conveying sections 2a-4a thereof turn anti-clockwise as seen from above so as to transport a product downwardly.

The radii of the conveying sections 2a, 4a of the first and third conveyor belts 2, 4 along their helical paths are the same and smaller than the radius of the conveying section 3a of the second conveyor belt 3 along its helical path. The helical paths of the conveying sections 2a, 3a of the first and second conveyor belts 2, 3 have such radii that imaginary projections thereof on a plane perpendicular to their centerlines fit into each other. Similarly, the helical paths of the conveying sections 3a, 4a of the second and third conveyor belts 3, 4 have such radii that imaginary projections thereof on a plane perpendicular to their centerlines fit into each other.

In order to minimize differences of speed of the conveying sections 2a, 3a of the first and second conveyor belts 2, 3 at the first transfer region 5 and the conveying sections 3a, 4a of the second and third conveyor belts 3, 4 at the second transfer region 7 the second conveyor belt 3 needs to be driven at a higher speed than the first and third conveyor belts 2, 4. The first to third conveyor belts 2-3 may be driven such that the angular speeds of the outer bend of the conveying section 2a of the first conveyor belt 2 and the inner bend of the conveying section 3a of the second conveyor belt at the first transfer region 5 are substantially equal and that the angular speeds of the inner bend of the conveying section 3a of the second conveyor belt 3 and the outer bend of the conveying section 4a of the third conveyor belt 4 at the second transfer region 7 are substantially equal.

Figure 3:
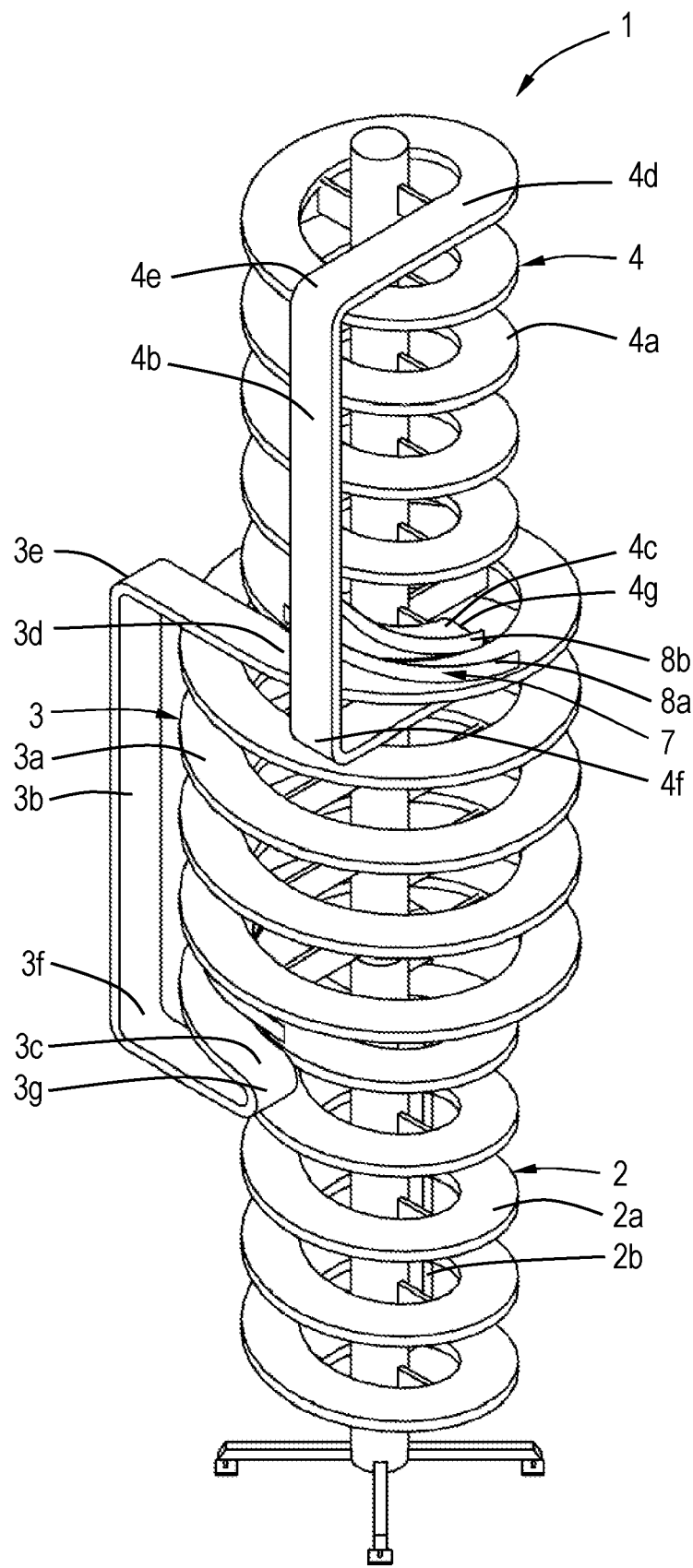
FIGS. 3 and 4 are similar views as FIGS. 1 and 2, respectively, but showing an alternative embodiment.
Figure 4:
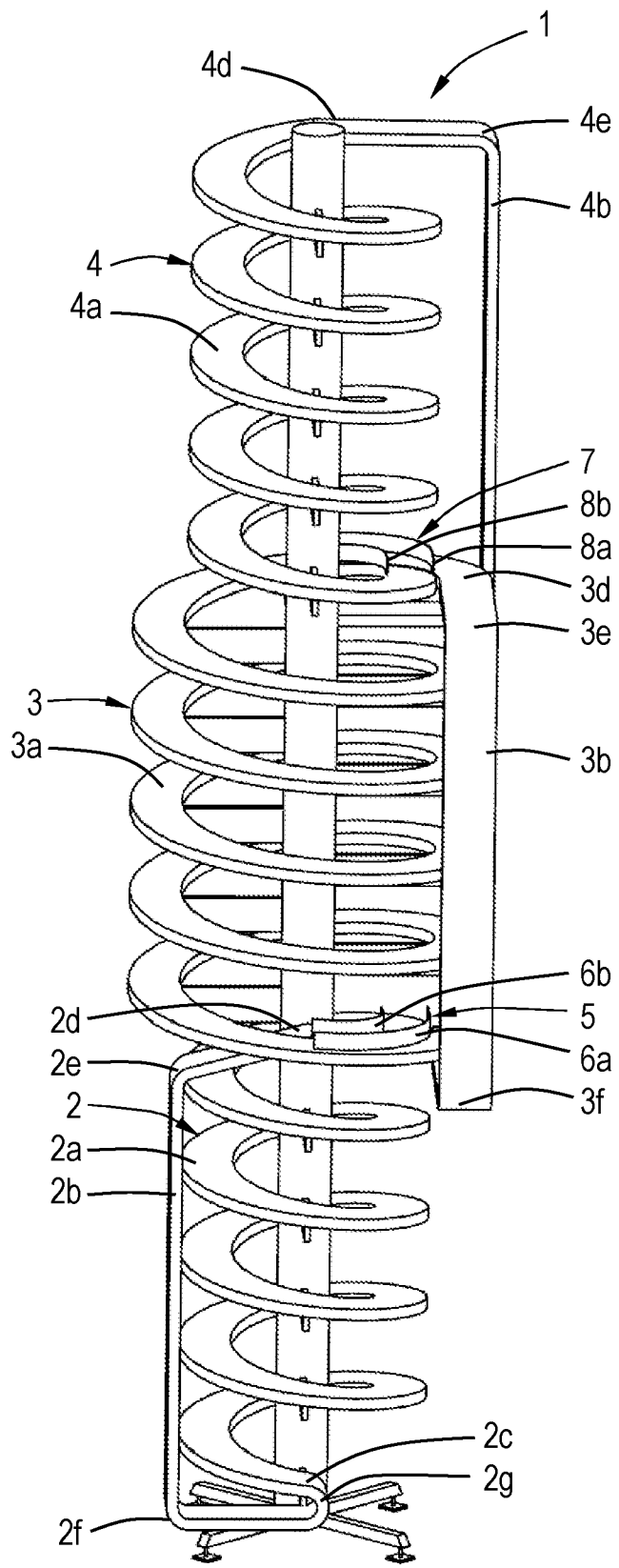

FIGS. 3 and 4 show an alternative embodiment. Parts which correspond to the embodiment as shown in FIGS. 1 and 2 are referred to by the same reference numbers. It can be seen that the return sections 2b-4b of the first to third conveyor belts 2-4 follow shorter non-helical paths than in the embodiment as shown in FIGS. 1 and 2. Beyond the upper end 2d of the helical path of the conveying section 2a of the first conveyor belt 2 as seen from the helical path thereof, the conveying section 2a of the first conveyor belt 2 follows a non-helical, horizontally oriented upper path which extends below a lower winding of the helical path of the conveying section 3a of the second conveyor belt 3. Between the horizontally oriented upper path and the return section 2b of the first conveyor belt 2 the first conveyor belt 2 follows a downward bend 2e, i.e. a positive bend, such that the return section 2b of the first conveyor belt 2 follows a vertically oriented path outside the windings of the helical path of the conveying section 2a of the first conveyor belt 2. At the lower end 2c of the helical path of the conveying section 2a of the first conveyor belt 2 the first conveyor belt 2 follows a reverse bend 2g, i.e. a positive bend, where it is turned upside down. Beyond the reverse bend 2g as seen from the helical path of the conveying section 2a of the first conveyor belt 2 the return section 2b of the first conveyor belt 2 has a horizontally oriented lower path. Between the horizontally oriented lower path and the vertically oriented path the return section 2b of the first conveyor belt 2 has an upward bend 2f, i.e. a positive bend.

It is noted that the terms 'horizontally oriented' and 'vertically oriented' herein means that the corresponding path may differ from exactly horizontal and vertical, respectively. In case of an inclined 'horizontally oriented' portion of a conveyor belt having an acute inclination angle with respect to the horizontal, its inclination angle is smaller than 90° or smaller than the inclination angle of a 'vertically oriented' portion of the conveyor belt having an acute inclination angle with respect to the horizontal.

The configurations of the second and third conveyor belts 3, 4 are comparable to the configuration of the first conveyor belt 2 and are also provided with respective downward bends 3e, 4e, respective upward bends 3f, 4f, respective reverse bends 3g, 4g, respective horizontally oriented upper and lower paths and respective vertically oriented paths. The horizontally oriented lower path of the third conveyor belt 4 extends below un upper winding of the helical path of the conveying section of the second conveyor belt 3.

Figure 5:
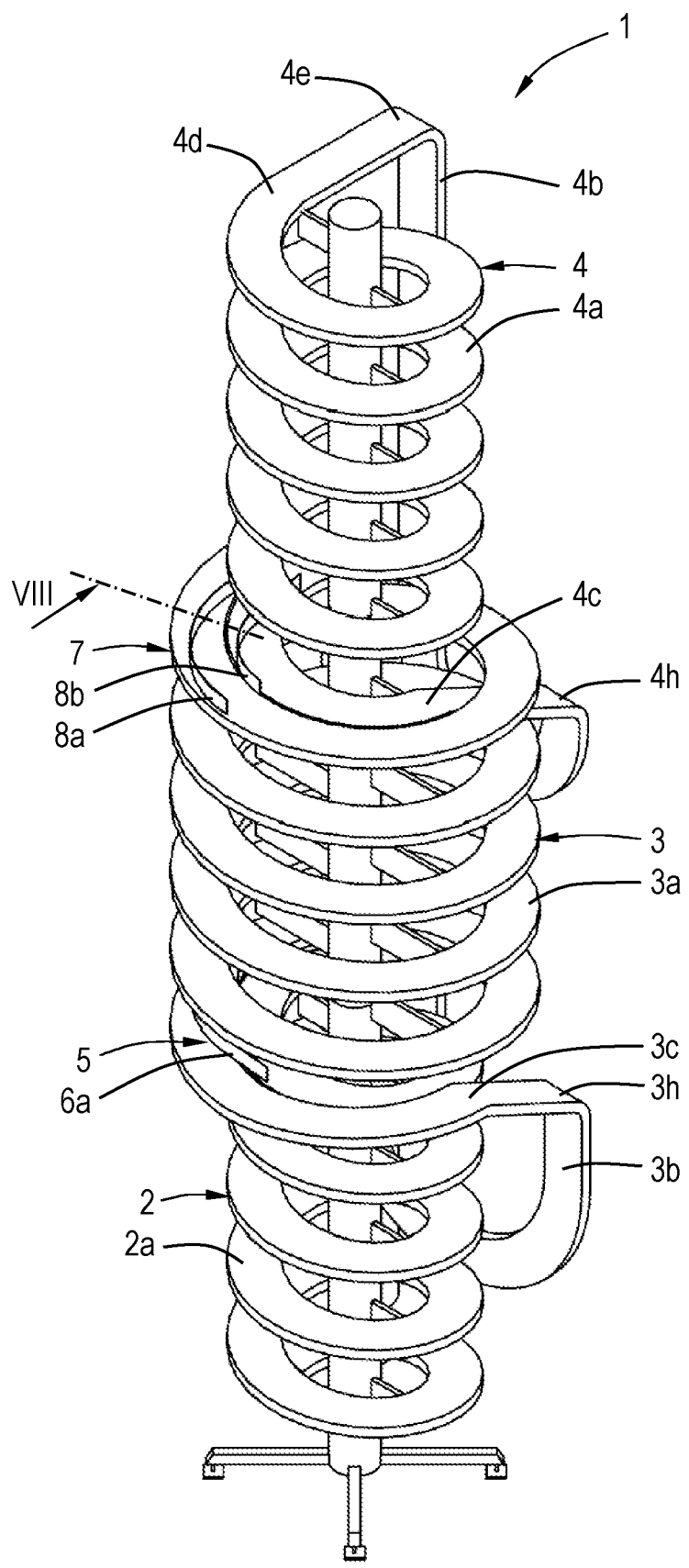
FIGS. 5 and 6 are similar views as FIGS. 1 and 2, respectively, but showing another alternative embodiment.
Figure 6:
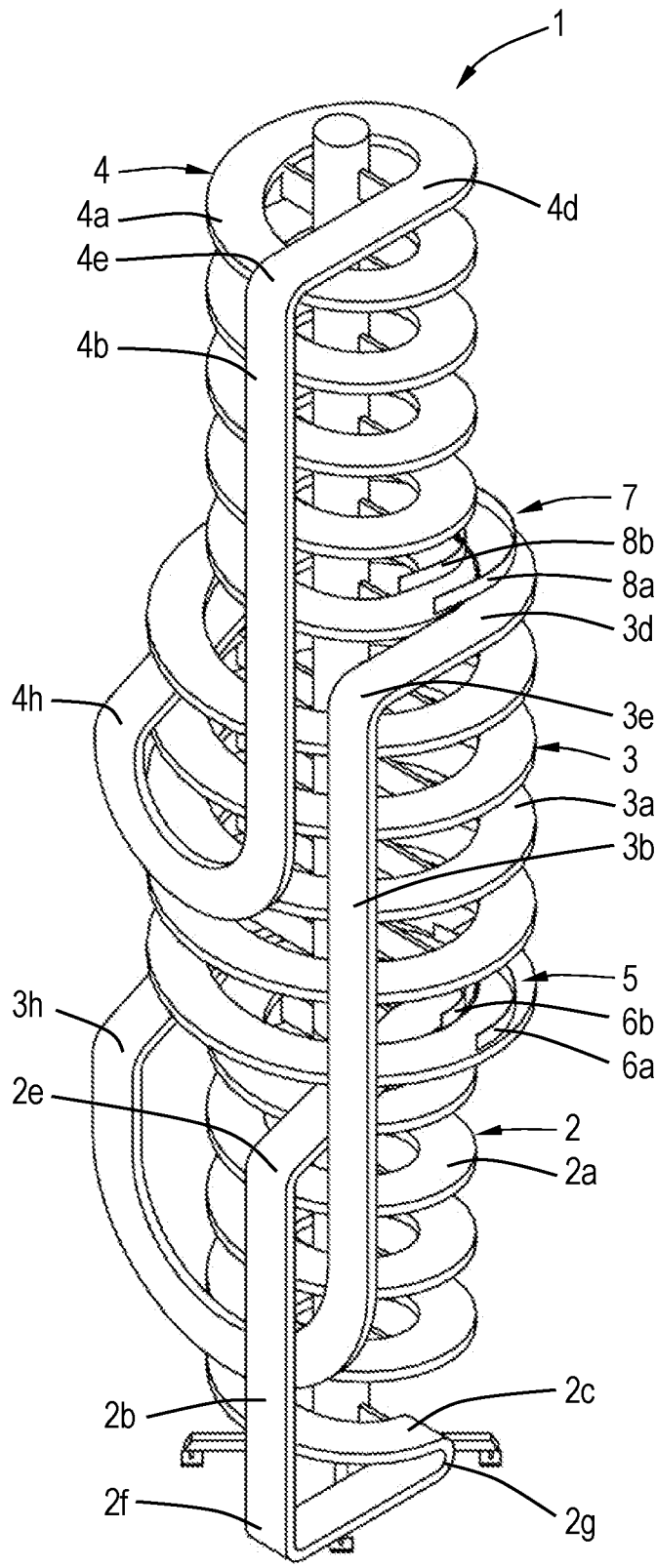

FIGS. 5 and 6 show another alternative embodiment. Parts which correspond to the embodiment as shown in FIGS. 1-4 are referred to by the same reference numbers. It can be seen that the return section 2b of the first conveyor belt 2 is similar to the embodiment as shown in FIGS. 3-4. The second and third conveyor belts 3, 4 are provided with respective upper downward bends 3e, 4e, respective horizontally oriented upper paths between the respective upper ends 3d, 4d of the helical paths of the conveying sections 3a, 4a of the second and third conveyor belts 3, 4, respectively, and vertically oriented paths outside the windings of the helical paths of the conveying sections 2a-4a of the first to third conveyor belts 2-4. The vertically oriented paths of the second and third conveyor belts 3, 4 have J-shapes and extend between the upper downward bends 3e, 4e and lower downward bends 3h, 4h, respectively. Hence, the second and third conveyor belts 3, 4 do not have reverse bends where the first and second conveyor belts 3, 4 are turned upside down. Between the lower ends 3c, 4c of the helical paths of the conveying sections 3a, 4a of the second and third conveyor belts 3, 4 and the downward bends 3h, 4h of the second and third conveyor belts 3, 4 the conveying sections 3a, 4a have horizontally oriented lower paths. The horizontally oriented lower path of the third conveyor belt 4 extends below an upper winding of the helical path of the conveying section 3a of the second conveyor belt 3. FIGS. 5 and 6 show that the first to third conveyor belts 2-4 are arranged such that the vertically oriented paths of the return sections 2b-4b are located at the same side of the conveying system 1, which provides a compact configuration.

FIGS. 5 and 6 show that the downward bends 3e, 4e at the horizontally oriented upper paths and the downward bends 3h, 4h at the horizontally oriented lower paths are positive bends. Within each of the J-shapes the second and third conveyor belts 2, 3 bend about respective axes which extend perpendicularly to planes in which the product supporting sides or the upper sides of the second and third conveyor belts 2, 3 lie. The return section 2b of the first conveyor belt 2 may also be J-shaped like the return sections 3b, 4b of the second and third conveyor belts 3, 4, respectively, but in that case there should be sufficient space at a lower height level than the lower winding of the first conveyor belt 2 to accommodate the J-shape.

It is also possible that one or more of the return sections of the first to third conveyor belts have a reverse J-shape, which configuration is disclosed in EP 3 228 564. In that case the upper end and the lower end of the helical path of the corresponding conveying section may have respective reverse bends to horizontally oriented upper and lower paths of the corresponding return section, whereas upward bends may be present between the vertically oriented reverse J-shape and the upper and lower horizontally oriented paths, respectively. Also in such a configuration the conveyor belts would follow positive bends only.

Figure 7:
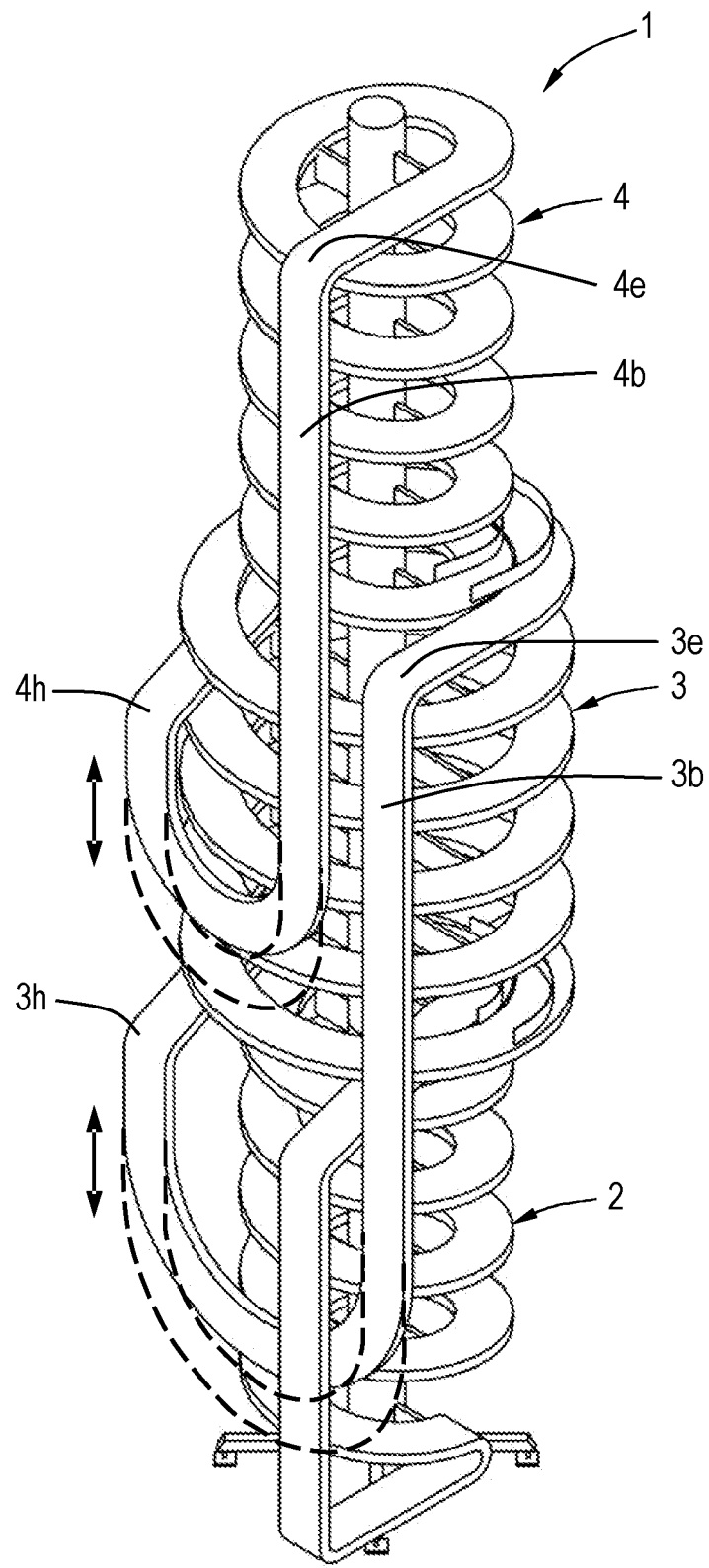
FIG. 7 is a similar view as FIG. 6, but showing an alternative embodiment.

FIG. 7 shows an embodiment of the conveying system 1 which is similar to the embodiment as shown in FIGS. 5 and 6. The vertically oriented paths of the return sections 3b, 4b of the second and third conveyor belts 3, 4 have J-shapes, but in this case the length of the path that each of the second and third conveyor belts 3, 4 follows along the J-shape between the upper downward bend 3e, 4e and the lower downward bend 3h, 4h is variable. Due to this feature the total length of the second and third conveyor belts 3, 4 may vary. This is advantageous in case their lengths increase due to wear, which typically occurs in the event that the conveying system 1 is operated dynamically, for example by frequent stops and starts, particularly in case of slat belts in which the slats are mutually coupled via a chain. The J-shape in each of the return sections 3*b*, 4*b* provides the opportunity to shift a bottom of the J-shape downwardly as illustrated by double headed arrows and broken lines in FIG. 7. It may be clear that a length compensation in this way is much easier than making the conveyor belt 3, 4 shorter.

There are several options to shift the bottom of the J-shape downwardly. For example, the conveyor belt 3, 4 at the bottom of the J-shape may be guided by a U-shaped frame which is movable with respect to the upper and lower downward bends 3*h*, 4*h*, 3*e*, 4*e*, which have fixed locations. It is also possible that the second and third conveyor belts 3, 4 freely suspend from the upper and lower downward bends 3*h*, 4*h*, 3*e*, 4*e* or from fixed locations below the upper and lower downward bends 3*h*, 4*h*, 3*e*, 4*e*, i.e. without support of a frame. The lengths of the second and third conveyor belts 3, 4 may be compensated automatically due to their own weight at the bottom of the J-shape or by means of an actuator or a spring or the like.

It is also possible that the configurations of the second or third conveyor belts including the J-shaped vertically oriented paths and their length compensation are applied as separate conveyor belts without a transfer region. In other words, the conveying system can be defined as follows.

Aspect 1: A conveying system for transporting a product in vertical direction, comprising a drivable endless conveyor belt 3 for supporting and transporting a product, which conveyor belt 3 extends along a helical path including a plurality of windings between a lower end 3*c* and an upper end 3*d* thereof, wherein the conveyor belt 3 follows a non-helical path between the upper end 3*d* and the lower end 3*c* outside the helical path, wherein the conveyor belt 3 has an upper downward bend 3*e* which is located such that the conveyor belt 3 follows a horizontally oriented upper path between the upper end 3*d* and the upper downward bend 3*e* and a lower downward bend 3*h* which is located such that the conveyor belt 3 follows a horizontally oriented lower path between the lower end 3*c* and the lower downward bend 3*h* and wherein the conveyor belt 3 has a vertically oriented section extending downwardly from both the upper and lower downward bends 3*e*, 3*h* and following a J-shaped path between the upper and lower downward bends 3*e*, 3*h*.

Aspect 2: A conveying system according to aspect 1, wherein the vertically oriented section extends within a vertical plane.

Aspect 3: A conveying system according to aspect 1 or 2, wherein the length of the path that the conveyor belt 3 follows along the J-shape between the upper downward bend 3*e* and the lower downward bend 3*h* is variable.

Aspect 4: A conveying system 1 according to aspect 3, wherein the conveyor belt 3 is guided by a U-shaped frame along at least a bottom of the J-shape, which U-shaped frame is movable with respect to the upper and lower downward bends 3*e*, 3*h* in vertical direction.

Aspect 5: A conveying system according to aspect 3, wherein a portion of the conveyor belt 3 freely suspends from the upper and lower downward bends 3*e*, 3*h* or from locations below the upper and lower downward bends 3*e*, 3*h* within upwardly directed legs of the J-shape such that the weight of the freely suspending portion of the conveyor belt 3 automatically lowers a bottom of the J-shape in case of increasing length of the conveyor belt 3.

Figure 8:
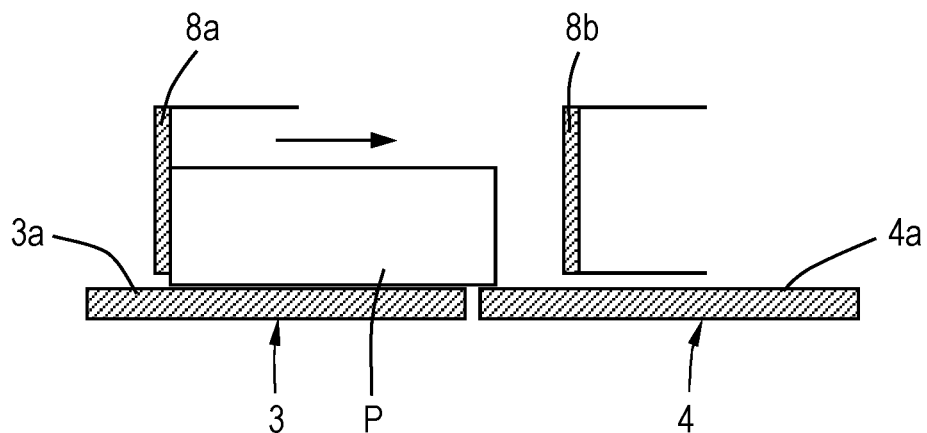
FIG. 8 is a sectional view along the line VIII in FIG. 5.

FIG. 8 shows in detail how a product P which is transported upwardly by the second conveyor belt 3 is transferred from the conveying section 3*a* of the second conveyor belt 3 to the conveying section 4*a* of the third conveyor belt 4. The product P is forced by the outer one 8*a* of the second guides 8*a*, 8*b*. In this case the upper sides of the conveying sections 3*a*, 4*a* of the first and second conveyor belts 2, 3 are flush with each other. This means that the product P slides over both the second and third conveyor belts 3, 4.

Figure 9:
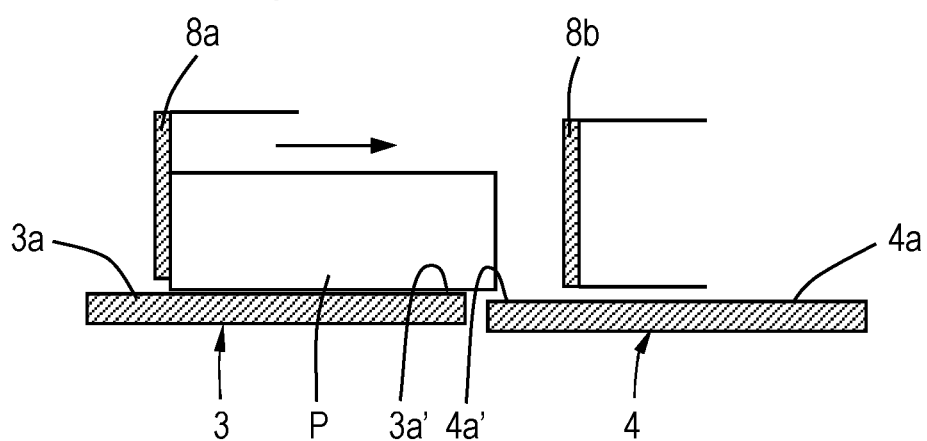
FIGS. 9, 10, 11A and 11B are similar views as FIG. 8, but showing alternative embodiments.

FIG. 9 shows an alternative embodiment in which in cross-section of the second transfer region 7 the upper sides of the conveying sections 3*a*, 4*a* of the second and third conveyor belts 3, 4 are horizontal, but wherein the upper sides of the conveying section 3*a* of the second conveyor belt 3 lies slightly higher than the upper side of the conveying section 4*a* of the third conveyor belt 4. Consequently, the product P which passes the second transfer region 7 will be supported by the second conveyor belt 3 and move above the third conveyor belt 4 without contacting the third conveyor belt 4. The product P may tilt about the inner bend of the second conveyor belt 3 and contact the third conveyor belt 4 when its center of gravity passes the inner bend of the second conveyor belt 3. This means that the period in which the product P is supported by both the second and third conveyor belts 3, 4 is relatively short. This helps to minimize wear of the conveyor belts 3, 4, in particular when the angular speeds of the second and third conveyor belts 3, 4 are different at the second transfer region 7. In general terms at least an edge portion 3*a*' of the upper side of the conveying section 3*a* of the second conveyor belt 3 lies at a higher level than at least an edge portion 4*a*' of the upper side of the conveying section 4*a* of the third conveyor belt 4, which edge portions 3*a*', 4*a*' are adjacent to each other and extend along the second transfer region 7.

Figure 10:
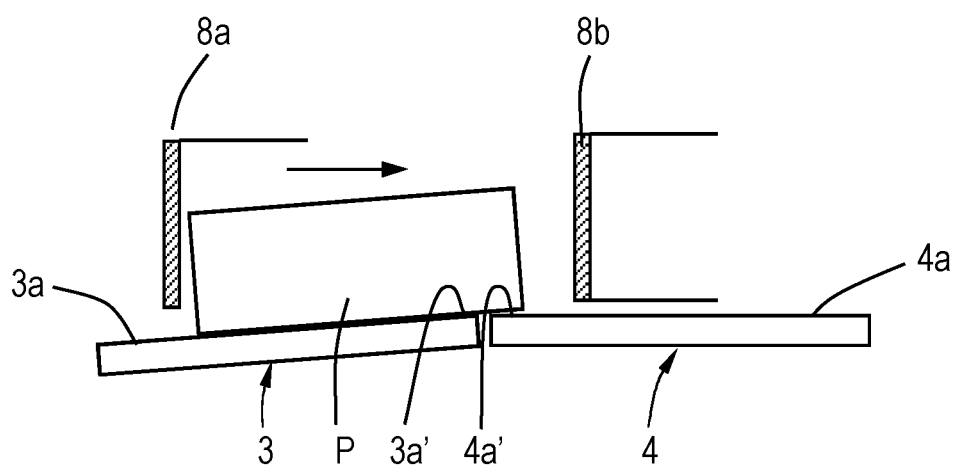

FIG. 10 shows an embodiment which is comparable to the embodiment as shown in FIG. 9, but wherein the second conveyor belt 3 is banked or inclined. The upper sides of the first and second conveyor belts 2, 3 are angled with respect to each other such that their common upper side forms an angle larger than 180° as seen in cross-section.

Figure 11A:
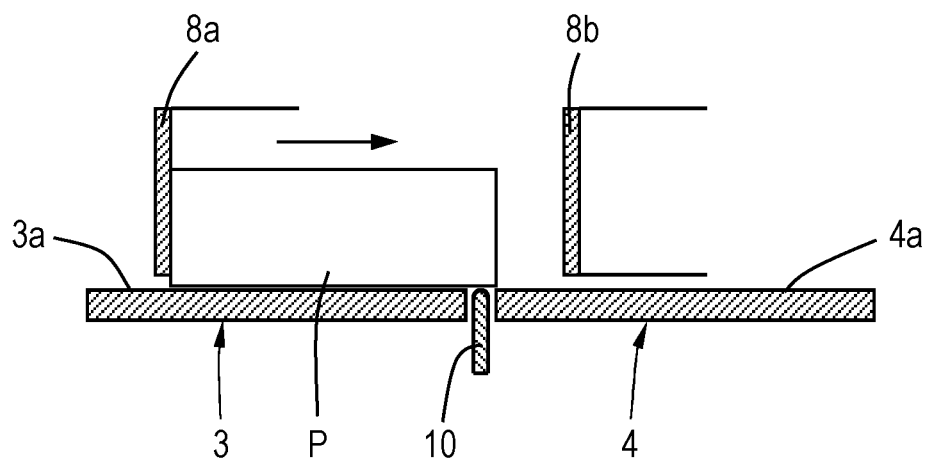
Figure 11B:
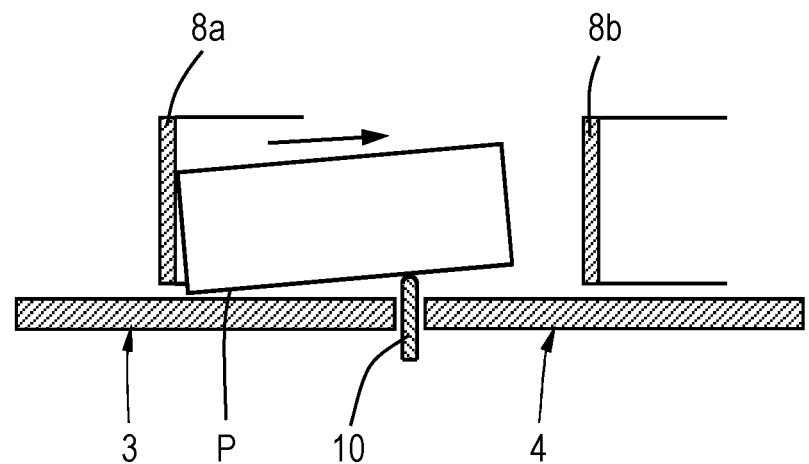

FIGS. 11A and 11B show an embodiment wherein the transfer of a product P is illustrated at two different locations along the second transfer region 7. FIG. 11A shows a situation in which the outer one 8*a* of the second guides 8*a*, 8*b* has just started to push the product P towards the third conveyor belt 4. Between the second and third conveyor belts 3, 4 is a lifting element in the form of an upwardly directed plate which has an upper rim that gradually raises along the second transfer region 7 in the direction of movement of the first and second conveyor belts 3, 4. In the situation as shown in FIG. 11A the upper rim is flush with the upper sides of the second and third conveyor belts 3, 4 or just below thereof. FIG. 11B shows a situation further downstream where the upper rim of the plate 10 projects above the upper sides of the second and third conveyor belts 3, 4. In this situation the passing product P is tilted by the plate 10 and at the same time forced to move towards the third conveyor belt 4. At a certain moment the product P will tilt to the third conveyor belt 4 and supported and transported by the third conveyor belt 4 only.

The embodiments as shown in FIGS. 8-11 may also be applied to conveyor belts which are parallel and next to each other and driven in the same direction, without being limited to the stack of the conveyor belts or to helical conveyor belts as described hereinbefore.

The invention is not limited to the embodiments shown in the drawings and described hereinbefore, which may be varied in different manners within the scope of the claims and their technical equivalents.

What is claimed is:

1. A conveying system for transporting a product in vertical direction, comprising:

a drivable endless first conveyor belt and a drivable endless second conveyor belt, each having a conveying section configured to support and transport a product and a return section, which conveying section extends along at least a helical path including a plurality of windings about a centerline between a lower end and an upper end of the helical path, wherein the lower end of the helical path of the conveying section of the first conveyor belt is located at a lower level than the lower end of the helical path of the conveying section of the second conveyor belt, wherein the upper end of the helical path of the conveying section of the second conveyor belt is located at a higher level than the upper end of the helical path of the conveying section of the first conveyor belt, and wherein the upper end of the helical path of the conveying section of the first conveyor belt is located between the lower end and the upper end of the helical path of the conveying section of the second conveyor belt; and a transfer region between the lower end of the helical path of the conveying section of the second conveyor belt and the upper end of the helical path of the conveying section of the first conveyor belt where the first and second conveyor belts extend parallel and next to each other and move in the same direction of movement under operating conditions and with a transfer member configured to displace a product between the first and second conveyor belts at the transfer region.

2. The conveying system according to claim 1, wherein the return section of at least one of the first and second conveyor belts extends below the respective conveying section, following the helical path of the respective conveying section upside down with respect to the respective conveying section.

3. The conveying system according to claim 1, wherein the return section of at least one of the first and second conveyor belts extends along a non-helical path.

4. The conveying system according to claim 3, wherein the at least one of the first and second conveyor belts has a downward bend which is located such that the at least one of the first and second conveyor belts follows a horizontally oriented upper path between the upper end of the helical path of the conveying section of the at least one of the first and second conveyor belts and the downward bend and a vertically oriented path below the downward bend, which vertically oriented path is located at an outer side of the windings of the helical path of the conveying section of the at least one of the first and second conveyor belts.

5. The conveying system according to claim 4, wherein the at least one of the first and second conveyor belts has a reverse bend at the lower end of the helical path of the conveying section of the at least one of the first and second conveyor belts for turning the conveyor belt of the at least one of the first and second conveyor belts upside down, wherein the at least one of the first and second conveyor belts follows a horizontally oriented lower path between the reverse bend and an upward bend, wherein the at least one of the first and second conveyor belts follows the vertically oriented path between the downward bend and the upward bend.

6. The conveying system according to claim 4, wherein the downward bend is an upper downward bend and the at least one of the first and second conveyor belts has a lower downward bend which is located between the vertically oriented path and a horizontally oriented lower path, wherein the vertically oriented path between the upper downward bend and the lower downward bend has a J-shape and the horizontally oriented lower path extends between the lower downward bend and the lower end of the helical path of the conveying section of the at least one of the first and second conveyor belts.

7. The conveying system according to claim 6, wherein the J-shaped vertically oriented path extends within a vertical plane.

8. The conveying system according to claim 5, wherein the at least one of the first and second conveyor belts is the first conveyor belt.

9. The conveying system according to claim 1, wherein the transfer region along the first and second conveyor belts is shorter than one winding.

10. The conveying system according to claim 1, wherein the transfer member is configured such that the transfer member pushes a passing product from one of the first conveyor belt and the second conveyor belt to the other one of the first conveyor belt and the second conveyor belt.

11. The conveying system according to claim 10, wherein at the transfer region upper sides of the conveying sections of the first and second conveyor belts are flush with each other.

12. The conveying system according to claim 1, wherein under operating conditions speeds of the first conveyor belt and the second conveyor belt are controlled such that angular speeds thereof are substantially the same at the transfer region.

13. The conveying system according to claim 1, wherein the helical paths of the conveying sections of the first and second conveyor belts have such radii that imaginary projections thereof on a plane perpendicular to their centerlines fit into each other.

14. The conveying system according to claim 12, wherein the centerlines of the helical paths of the conveying sections of the first and second conveyor belts coincide.

15. The conveying system according to claim 1, wherein the conveying system comprises at least a drivable endless third conveyor belt having a conveying section configured to support and transport a product and a return section, which conveying section of the third conveyor belt extends along at least a helical path including a plurality of windings about a centerline between a lower end and an upper end of the helical path of the conveying section of the third conveyor belt, wherein the upper end of the helical path of the conveying section of the third conveyor belt is located at a higher level than the upper end of the helical path of the conveying section of the second conveyor belt and wherein the upper end of the helical path of the conveying section of the second conveyor belt is located between the lower end and the upper end of the helical path of the conveying section of the third conveyor belt, wherein the transfer region is a first transfer region and the conveying system is provided with a second transfer region between the lower end of the helical path of the conveying section of the third conveyor belt and the upper end of the helical path of the conveying section of the second conveyor belt where the conveying sections of the second and third conveyor belts extend parallel and next to each other, wherein the transfer member is a first transfer member and the conveying system is provided with a second transfer member configured to displace a product between the second and third conveyor belts at the second transfer region.

16. The conveying system according to claim 6, wherein the at least one of the first and second conveyor belts is the second conveyor belt.

17. The conveying system according to claim 7, wherein the at least one of the first and second conveyor belts is the second conveyor belt.

18. The conveying system according to claim 10, wherein at least an edge portion of an upper side of the conveying section of the one of the first conveyor belt and the second conveyor belt lies at a higher level than at least an edge portion of an upper side of the conveying section of the other one of the first conveyor belt and the second conveyor belt, which edge portions are adjacent to each other and extend along the transfer region.

19. The conveying system according to claim 10, wherein upper sides of the first and second conveyor belts are angled with respect to each other such that a common upper side forms an angle larger than 180° as seen in cross-section.

20. The conveying system according to claim 10, wherein a lifting element is provided between the conveying sections of the first and second conveyor belts at the transfer region, which lifting element is configured such that an upper side thereof gradually rises above the first and second conveyor belts in the direction of movement of the first and second conveyor belts in order to lift a product that is moving from the one of the first conveyor belt and the second conveyor belt to the other one of the first conveyor belt and the second conveyor belt before the product arrives at the other one of the first conveyor belt and the second conveyor belt.

21. The conveying system according to claim 9, wherein the transfer region along the first and second conveyor belts is smaller than a half winding.

* * * * *